(12) United States Patent
Kelley

(10) Patent No.: US 7,187,940 B2
(45) Date of Patent: Mar. 6, 2007

(54) DECORRELATING RAKE RECEIVER APPARATUS AND METHOD

(75) Inventor: Brian Todd Kelley, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 511 days.

(21) Appl. No.: 10/631,799

(22) Filed: Jul. 31, 2003

(65) Prior Publication Data

US 2005/0026578 A1 Feb. 3, 2005

(51) Int. Cl.
*H04B 1/00* (2006.01)
*H04B 15/00* (2006.01)
*H04B 7/126* (2006.01)

(52) U.S. Cl. .................. 455/501; 455/506; 455/63.1; 455/65; 455/132; 455/137; 375/142; 375/144; 370/342

(58) Field of Classification Search ........ 455/501–506, 455/63.1, 65, 67.11, 67.16, 130, 132–139, 455/269–273, 275–278.1, 296, 306; 375/142–144, 375/147–152, 343, 349, 350; 370/335, 342
See application file for complete search history.

(56) References Cited

U.S. PATENT DOCUMENTS

| | | | | | |
|---|---|---|---|---|---|
| 5,414,699 | A | * | 5/1995 | Lee | 370/342 |
| 5,682,341 | A | * | 10/1997 | Kim et al. | 708/322 |
| 6,078,573 | A | * | 6/2000 | Batalama et al. | 370/335 |
| 6,404,806 | B1 | * | 6/2002 | Ginesi et al. | 375/222 |
| 6,771,706 | B2 | * | 8/2004 | Ling et al. | 375/267 |
| 6,795,392 | B1 | * | 9/2004 | Li et al. | 370/210 |
| 2004/0095990 | A1 | * | 5/2004 | Gossett et al. | 375/148 |
| 2004/0223480 | A1 | * | 11/2004 | Nguyen et al. | 370/342 |

OTHER PUBLICATIONS

Wang et al , "Adaptive joint multiuser detection and channel estimation in multipath fading CDMA channels", Wireless Networks 4, 1998, pp. 453-470.*
Liu et al , "A decorrelating RAKE receiver for CDMA Communication over Frequency-selective Fading Channel", vol. 47, No. 7, Jul. 1999, pp. 1036-1045.*
Lupas and Verdu et al, "Near-Far Resistance of Multiuser Detectors in Asynchronous Channels", IEEE Trans. On Communication, vol. 38, No. 4, Apr. 1990.*
Monson H. Hayes, "Statistical Digital Signal Processing and Modeling", Jon Wiley & Sons, Inc. New York, Chichester, Brisbane, Toronto, Singapore, "The Levinson Recursion" pp. 215-520.
Hui Liu, Signal Processing Applications in CDMA Communications, Artech House Boston London, pp. 29-39.
Monson H. Hayes, "Statistical Digital Signal Processing and Modeling", Jon Wiley & Sons, Inc. New York, Chichester, Brisbane, Toronto, Singapore, "The Levinson Recursion" pp. 215-520, 1996.
Hui Liu, Signal Processing Applications in CDMA Communications, Artech House Boston London, pp. 29-39, 2000.

* cited by examiner

*Primary Examiner*—Duc M. Nguyen
(74) *Attorney, Agent, or Firm*—Charles W. Bethards

(57) ABSTRACT

A decorrelating rake receiver (401) using a signal processor (213) and corresponding method (1000) to determine filter coefficients (1005). The decorrelating rake receiver includes a plurality of filters (219) arranged to be coupled to an input signal (403) and the filter coefficients (409), the plurality of filters operable to provide a plurality of output signals and a coefficient generator (407), coupled to the input signal, to explicitly and definitely determine the filter coefficients for the plurality of filters such that the plurality of filters perform a decorrelating rake process. The decorrelating rake receiver further includes a combiner (221) to combine the plurality of output signals and provide a received signal (405). The decorrelating rake receiver (401) is suitable for use in a wireless communication device (101) or base transceiver (103).

22 Claims, 6 Drawing Sheets

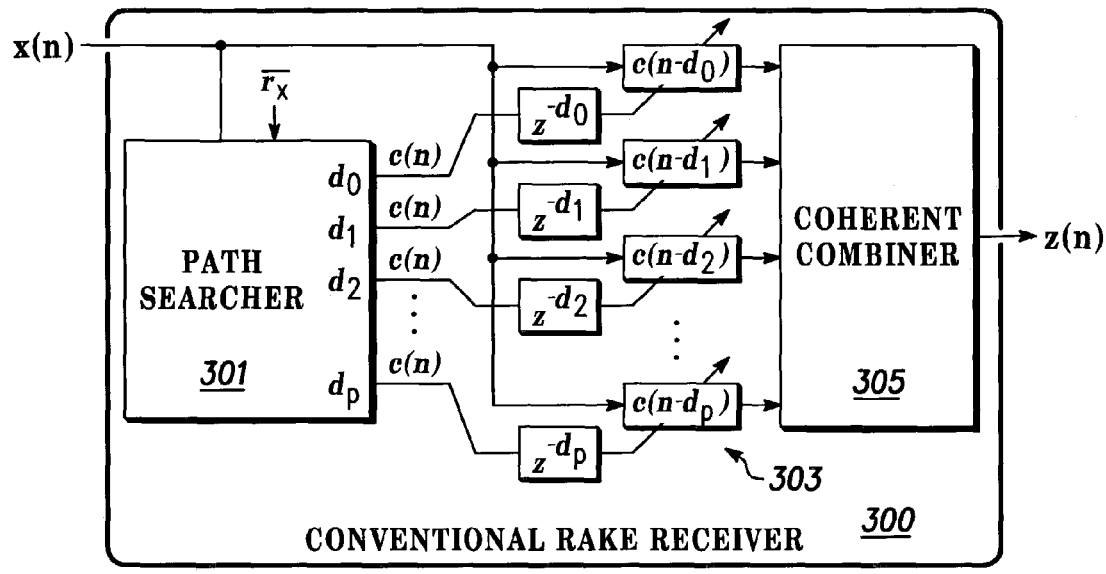
*- PRIOR ART -* FIG. 3
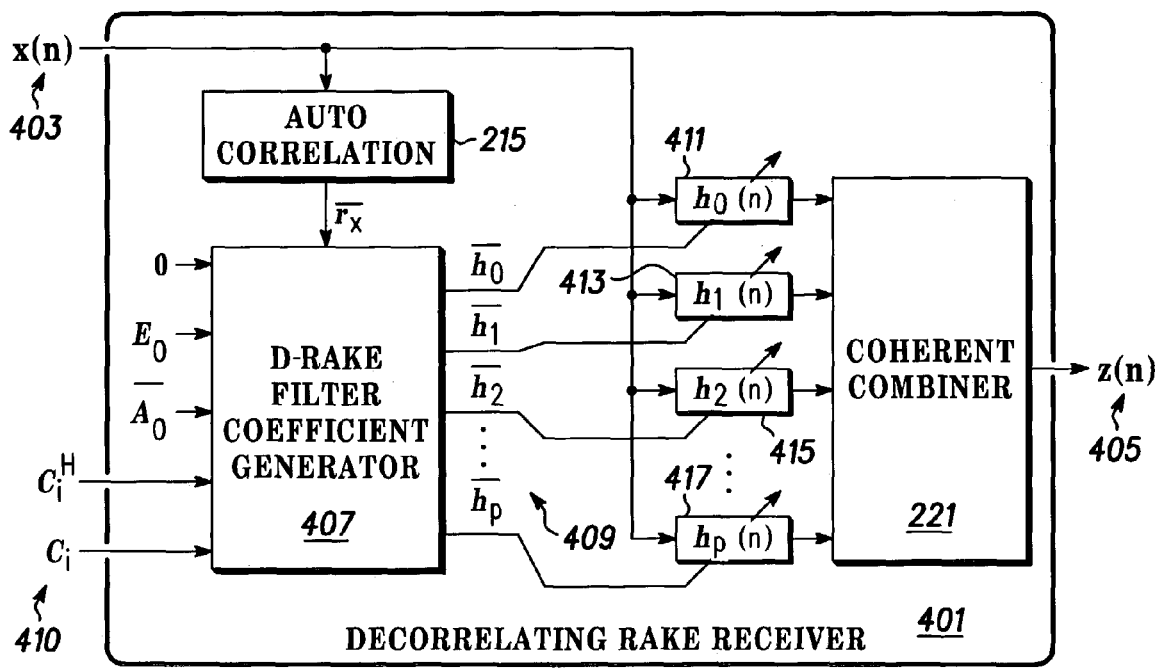
FIG. 4

DECORRELATING RAKE RECEIVER APPARATUS AND METHOD

FIELD OF THE INVENTION

This invention relates in general to wireless communications devices and more specifically to apparatus and method for facilitating decorrelating rake receivers in such devices.

BACKGROUND OF THE INVENTION

Wireless communication devices or units such as subscriber devices and base transceivers providing data and voice services for users operating in corresponding systems are known. As these systems have evolved more sophisticated encoding and modulation schemes are being employed. Present systems often rely at least in part on schemes where orthogonality between signals is utilized to distinguish a signal from all others. A classic example of such a system is a spread spectrum system, such as a code division multiple access system where spreading codes that are orthogonal to each other are used to distinguish one signal from another. In theory when the proper code is used to despread the signal, the desired signal will exhibit a strong positive correlation and thus be recoverable while all others will simply be respread and thus contribute to interference, normally referred to as multiple access interference (MAI). In the end, MAI establishes an upper bound on system capacity for such systems.

In practice, due to the vagaries of wireless propagation and thus multiple propagation paths, receivers in spread spectrum systems often use rake receivers in order to recover desired signal energy from multiple paths. While the rake receiver approach will increase the desired signal energy it will have no impact on MAI, hence system capacity. Practitioners have contemplated decorrelating rake receivers. The decorrelating rake receiver attempts to increase desired signal energy and reduce MAI, thus improving or increasing system capacity. However known approaches for implementing decorrelating rake receivers are computationally intensive and typically rely on estimation techniques with unknown convergence properties for estimating parameters. A need exists for improved methods and apparatus to facilitate a decorrelating rake receiver.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 3 depicts a basic diagram of a prior art rake receiver;

FIG. 4 depicts a functional diagram of a decorrelating rake receiver;

DETAILED DESCRIPTION OF PREFERRED EMBODIMENTS

Figure 1:
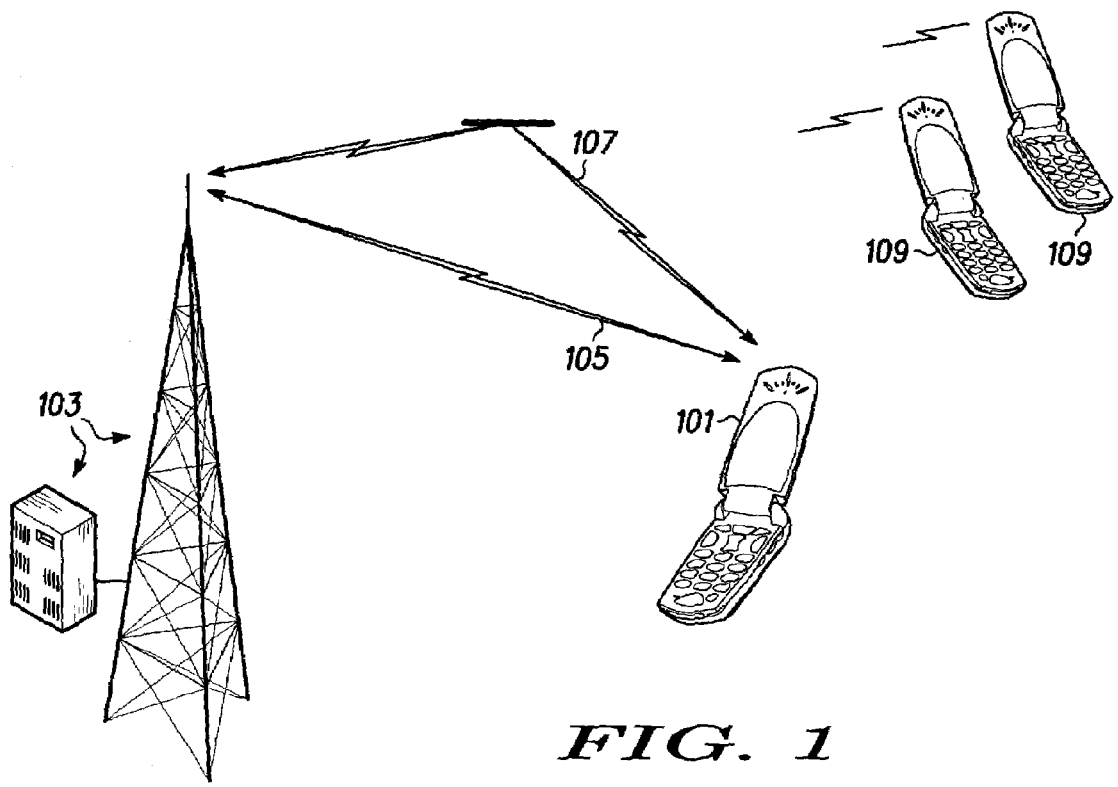
FIG. 1 depicts, in a simplified and representative form, a communication system and communication devices suitable for using a decorrelating rake receiver.

In overview, the present disclosure concerns communication systems including communication devices and base or fixed equipment and methods and apparatus for enabling and affecting a decorrelating rake receiver that may advantageously be used in such communication equipment, devices or units. More particularly various inventive concepts and principles embodied in communication systems, communication devices, base transceivers, signal processors, coefficient generators, and corresponding methods therein or thereof for providing or facilitating a decorrelating rake receiver by determining, generating, computing, or calculating directly, definitely, and precisely the requisite filter coefficients for implementing a decorrelating rake process in a highly efficient, deterministic, and predetermined manner are discussed and described. This coefficient calculation may be implemented in special purpose hardware in integrated circuit form or preferably in a signal processor such as a digital signal processor executing appropriate software. The wireless communication units are often referred to as subscriber devices, such as cellular phones or two-way radios or messaging devices and the like. Note that the devices or units can be a variety of devices with differing functionality, including for example a personal digital assistant, personal assignment pad, and personal computers equipped for wireless operation, a cellular handset or device, or equivalents thereof provided such equipment or devices are arranged and constructed for operation in accordance with the principles and concepts described and discussed.

The principles and concepts discussed and described may be particularly applicable to communication devices and systems that can provide or facilitate voice communication services or data or messaging services over wide area networks (WANs) or local area networks (W-LANs), where these systems utilize an access protocol that at least in part distinguishes signals based on orthogonality of those signals. Such systems include, for example conventional two way systems and devices and various cellular phone systems that use spread spectrum access technology, such as CDMA (code division multiple access) technologies and variants and evolutions thereof. These systems may commonly be referred to as IS-95, 2.5 G or EDGE, WCDMA, 3G such as UMTS (Universal Mobile Telecommunication Service) systems, integrated digital enhanced networks, 3.5G, 4G, and variants or evolutions thereof. Furthermore the wireless communication units or devices can have short range communications capability normally referred to as W-LAN capabilities, such as IEEE 802.11, Bluetooth, or Hiper-LAN and the like that preferably utilize CDMA, frequency hopping, or orthogonal frequency division multiplexing access technologies.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as digital signal processors or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, a simplified and representative form of a communication system and communication devices suitable for using a decorrelating rake receiver will be discussed and described. FIG. 1 shows a wireless communication device 101 that is engaged in a communication with a radio access network, shown as a base site or transceiver 103, as depicted by a direct signal or ray 105 and an indirect, reflected, or multipath signal or ray 107. Those of ordinary skill will recognize that practical wireless systems will exhibit a potentially large number of multipath signals, rather than the one depicted. Further shown are a multiplicity (two depicted) of other communication devices 109 that are also in communication with the base transceiver and whose signals occupy at least in part the same frequency spectrum at the same time and thus represent interference for the signals from or for communication device 101. This interference from other devices is often referred to as MAI (multiple access interference).

Note that the radio access network or base transceiver 103 may be part of a WAN or an access point for W-LAN and the communication devices 101 and 109 can be distinct devices with unique functionality so long as they each work on the communication system. As is known, but not depicted, the base transceiver is coupled to the balance of the radio access network and from there to some form of a public switched network, such as the public switched telephone network, Internet, or World Wide Web and thus other users of telecommunications services. Generally the radio access networks, W-LAN, and WAN systems are known to one of ordinary skill and will not be further described in any detail, apart from the necessities with respect to the preferred embodiments and principles and concepts herein. The communication units 101, 109 are also generally known other than the modifications and improvements disclosed herein. Thus the known functions and structure of such devices will not be described in detail other than as related to the inventive principles and concepts disclosed and discussed below.

As a reference point suppose the communication system of FIG. 1 is a spread spectrum system, such as a CDMA system. In spread spectrum communications, such as that found in various military applications, modems, 3G wireless communication devices and systems such as those noted earlier, the signals of interest are spread very widely in frequency by a pseudo random spreading code. The purpose of the spreading code is to randomize or whiten the desired message signal. This whitening process effectively spreads the original message frequency spectrum beyond the bandwidth of the original message thereby producing a spread spectrum signal. Furthermore, the spreading gain helps immunize the original message from noise interference. Two significant sources of system noise in spread spectrum and CDMA systems are Multiple Access Interference (MAI) and receiver interference due to multipath reflections.

Multiple access interference refers to the interference of different users or devices, such as 101 and any one of 109, simultaneously communicating over the same spread spectrum channel or spectrum. This interference, while mitigated by the implementation of orthogonal space codes, such as a known Hadamard or Walsh code, still fundamentally limits CDMA system capacity. Each transmitter-receiver pair communicates via a specific orthogonal code sequence. This sequence is uncorrelated with all other users or device's orthogonal codes (except its own, of course). Thus, once timing synchronization is achieved, all devices sending signals on other orthogonal channels appear as white noise at the desired receiver's antenna. Nevertheless, as many devices transmit simultaneously, the power or variance of the white noise interference increases the effective noise floor with which any particular device must contend. Conventional rake receivers do not attempt to suppress MAI (noise term). Instead they take advantage of the orthogonality of different users spreading codes. The correlation with its own spreading code produces a coding gain that increases the S/N for demodulation. System capacity limits are reached when the coding gain is not adequate enough to mitigate the MAI appearing when large numbers of users are concurrently communicating over the same CDMA frequency channel.

A second major component of system noise is multi-path reflections, such as multipath 107 from or for the same device. Conventional rake receivers attempt to utilize multipath reflections to their advantage by coherently combining multi-path signals arriving at different delays. Although the cumulative coherent combination of multi-path signals increases the effective signal energy, particular multi-path rays at a specific delay also accumulate the effective noise power of multipath signals that are not used by the rake receivers, often referred to as non-targeted delays or paths. In other words, each user's multi-path reflections interfere with its own targeted, delayed ray.

The present invention, as will be discussed advantageously and concurrently (1) offers increased system capacity by suppressing MAI noise through optimum filtering, (2) offers increased system capacity by decorrelating the set of received multi-path signals arriving at the different delays (3) directly and definitely computes the optimum decorrelating rake (DRAKE) filter coefficients for ideal rake decorrelation without using coefficients estimation techniques or computationally intensive procedures, (4) pipelines in one embodiment the computation of the ideal DRAKE coefficients in such a way that the computation could produce updated coefficients in O(N) time and thereby enabling the DRAKE processing to be applied to highly time varying wireless channels and (5) proposes a flexible architecture that could be easily embodied as a reconfigurable processor architecture or ASIC.

Figure 2:
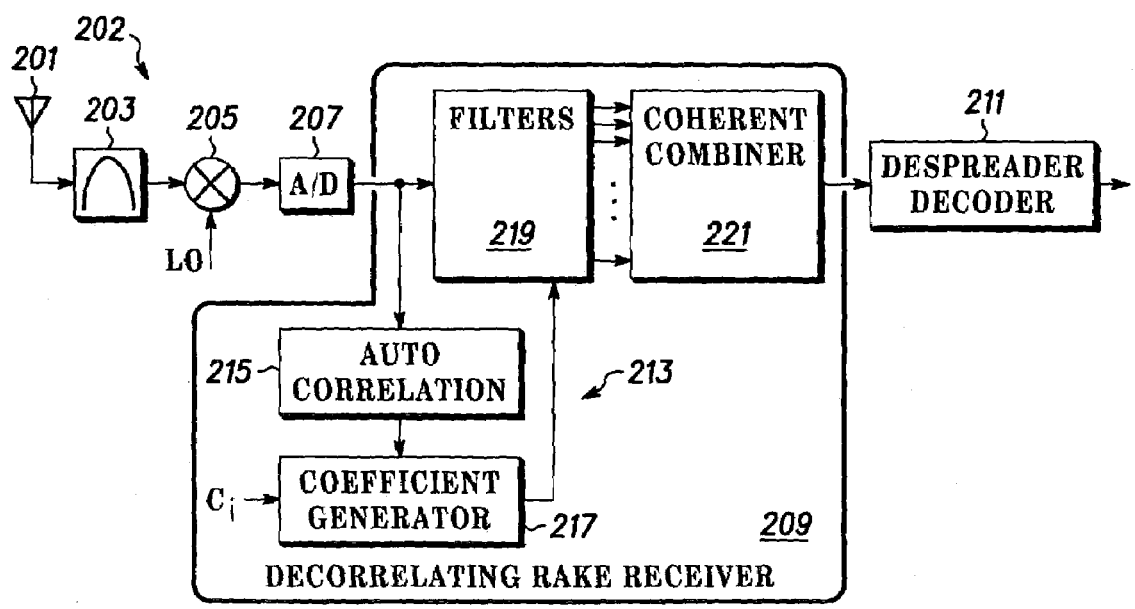
FIG. 2 depicts a diagram of a preferred embodiment of a communications device including a decorrelating rake receiver.

Referring to FIG. 2, a diagram of a preferred embodiment of a communications device including a decorrelating rake receiver, similar to one of the devices 101, 109 will be discussed and described. The communications device is arranged and constructed for receiving a spread spectrum signal and thus is shown as a simplified functional diagram that includes only the relevant portions of the receiver. Not depicted but known to one of ordinary skill is various functionality that may be found in many communications devices, such as a user interface including keypad, display, and audio transducers, a transmitter, frequency generation, and general controller elements, such as one or more processors and associated memory for storing, for example operating software and applications. Note that the specific functionality of portions, functional blocks or elements of the communications unit or device can depend on the particular access technology and other conventions used by the network and device providers. These specifics of transmission and reception and relevant processing are known and therefore any further discussions will be in generalities that are applicable to typical communication systems as well as the principles and concepts according to the present invention.

As shown the communication unit or device is coupled to and from a network, such as base transceiver 103 via an antenna 201. Signals from the antenna are coupled to and received by a receiver front end 202 as a composite spread spectrum signal. The receiver front end 202 includes: a gain and broadband filtering stage 203 that limits the bandwidth of the received signal; a mixer 205 that uses a local oscillator signal to down convert the signal from the gain stage 203 to a lower frequency; and an analog to digital (A/D) converter 207 that provides samples of the signal that has been down converted. Overall the receiver front end 202 operates to provide to a decorrelating rake receiver 209 a sampled spread spectrum signal corresponding to the composite spread spectrum signal. Note that the mixer in practice is two mixers that use a 90 degree phase shifted local oscillator signal to provide an in phase and quadrature (I and Q) signal to dual A/D converters and thus the sampled spread spectrum signal is comprised of complex samples as is known.

The decorrelating rake receiver 209 will be discussed briefly here and in more detail with reference to additional figures below. Generally the decorrelating rake receiver 209 operates to filter the sampled spread spectrum signal in a manner that optimizes or enhances the desired signal energy and concurrently minimizes or mitigates MAI due to undesired signals. The decorrelating rake receiver 209 provides a resultant signal or composite sampled output signal to a despreader 211 for dispreading to provide the spread spectrum signal. The despread signal or spread spectrum signal is subsequently decoded, error corrected, etc, as is known.

The decorrelating rake receiver 209 includes a coefficient generator 217 that is coupled to the input signal or sampled spread spectrum signal from the A/D converter 207 by an autocorrelation processor, unit, or function 215. The coefficient generator and autocorrelation processor can be viewed as a signal processor 213 that is arranged and constructed to determine filter coefficients for the decorrelating rake receiver. The coefficient generator explicitly and definitely determines filter coefficients for a plurality of filters 219, such that the plurality of filters perform a decorrelating rake process. The plurality of filters 219 are each coupled to the sampled spread spectrum signal or input signal and are arranged to accept and have characteristics that are defined by the filter coefficients. The plurality of filters 219 provide a plurality of output signals that are then combined coherently by a coherent combiner 221 to provide the composite sampled output signal having reduced levels of MAI. Note that the decorrelating rake receiver 209 and despreader/decoder 211 can be implemented as a DSP, such as a Motorola 56000 family DSP, and appropriate software or as an ASIC or some combination of both as those of ordinary skill will recognize. The signal processor 213 may be particularly suited for implementation as a general purpose digital signal processor that is executing software programs or instructions that are stored in an associated memory.

Referring to FIG. 3, a basic diagram of a prior art rake receiver 300 will be discussed and described. The conventional rake receiver includes a path searcher 301 that depending on autocorrelation parameters determines the strongest few of the various multipaths and the associated delay for these multipaths. The path searcher determines the multipath delay profile that allows each branch of the rake to correlate 303 its finger with the delayed ray arriving at the receiver. The output of the rake is then coherently combined in the combiner 305 with a specific algorithm such as maximum ratio combining. Since the conventional rake receiver utilizes a fixed set of correlation coefficients corresponding to the transmitter spreading code it is sub-optimum and does nothing to mitigate MAI.

Referring to FIG. 4, a functional diagram of a decorrelating rake receiver 401 that shows somewhat more detail than was depicted in FIG. 2 will be discussed and described. The decorrelating rake receiver of FIG. 4 can be used in either a wireless communication device 101, 109 or the wireless communication base transceiver 103.

As suggested above, the decorrelating rake receiver 401 processes an input signal, x(n) 403, with a plurality of filters 219 where the outputs from the filters are coherently combined by combiner 221 to provide an output or received signal z(n) 405. The plurality of filters 219 are configured and operate according to filter coefficients 409 provided or generated by a coefficient generator 407. The plurality of filters includes (p+1) filters $h_0(n)$ 411, $h_1(n)$ 413, $h_2(n)$ 415, through $h_p(n)$ 417 each arranged to be coupled to the input signal 403 and to accept and be configured according to respective filter coefficients, represented by the vectors $\overline{h_0}$–$\overline{h_p}$. Each of the plurality of filters is preferably a finite impulse response (FIR) filter that is operable to provide an output signal and collectively a plurality of output signals to the combiner 221.

The coefficient generator 407 is coupled to the plurality of filters and the input signal, specifically autocorrelation parameters corresponding to the input signal. The autocorrelation parameters are provided by the autocorrelation processor 215, which is preferably part of the decorrelating rake receiver although alternatively can be an entity that is separate from the receiver. The combination of the autocorrelation processor and coefficient generator in one or more embodiments may be viewed as a signal processor as noted above with reference to FIG. 2. The coefficient generator 407 operates to explicitly and definitely determine, calculate or compute the filter coefficients for the plurality of filters such that the plurality of filters perform a decorrelating rake process. As will be discussed and described these coefficients are advantageously efficiently, precisely, and definitely determined rather than resorting to estimating the filter coefficients as in prior art techniques. The coefficient generator relies on signal, receiver or user identification information, depicted by the $C_i$ and $C_i^H$ matrices 410 that are coupled to the generator. The combiner 221, preferably coherent combiner, combines the plurality of output signals and provides a received signal with reduced levels of MAI as compared to the input signal.

Generally the decorrelating rake receiver constrains the filter coefficients for each branch (filter) in a way that decorrelates the set of multipath rays presented as the input signal, $x(n)$ 403, prior to coherent combining. Due to this orthogonality constraint each finger of the combiner does not maintain reflected multipath noise of its delayed self. Furthermore, the filter's coefficients (i.e. h(n) coefficients) are not constrained to be fixed. They vary adaptively with the input signal in an attempt to simultaneous suppress the cumulative MAI noise power. The optimum values of the coefficients is found by solving the mathematical equation:

$$\overline{h_l} = \arg\min_{\overline{h_l}} \overline{h_l}^H R_x \overline{h_l} \text{ subject to } C^H \overline{h_l} = [0,0, \ldots 1,0,0, \ldots 0]^T = \overline{1}_l, \quad (1)$$

where the term $\overline{1}_l$ represents a vector of zeros with a one in the l'th position with 1 varying from 0 to p. The optimum solution has been shown, using Lagrange Multipliers, to be:

$$h_{l,opt} = R_x^{-1} C^H (C R_x^{-1} C^H)^{-1} \overline{1}_l \quad (2)$$

where C is a matrix of delayed spreading code sequences corresponding to the targeted i'th signal, device or user:

$$C = \begin{bmatrix} c_i(0) & \cdots & 0 \\ \vdots & \ddots & \vdots \\ c_i(L-1) & \cdots & c_i(0) \\ \vdots & \ddots & \vdots \\ 0 & \cdots & c_i(L-1) \end{bmatrix} \quad (3)$$

and $R_x$ is the conventional Hermitian Toeplitz autocorrelation matrix.

Note that the matrix C is formed from spreading code information where $c_i(0)$ through $c_i(L-1)$ are the sequence of L chips of the spreading code for the i'th signal, device or user. Thus the first column is a listing of the chips in the spreading code with 0s appended where the number of 0s appended is equal to p+1 corresponding to the number of filters. Successively shifting the first column down by one element and adding a 0 in the first row is used to form the remaining columns of the matrix C. Thus the dimensions of C are L+p+1 rows by p+1 columns. The number of filters or p+1 is usually selected in view of or to correspond to the delay spread or channel memory but may also be influenced by the amount of processing capacity available for coefficient generation and filtering. The delay spread is related to expected coverage area radius, e.g. relevant path length for a signal of interest translated to chip duration (inverse of chip rate which varies by access technology) as is known. $C^H$ denotes C Hermitian or a matrix that is the transpose of the matrix C with each element replaced with the complex conjugate of the corresponding element of the matrix C.

The matrix $R_x$ is comprised of autocorrelation parameters and arranged such that each lower diagonal is made up of the same autocorrelation parameter while upper diagonals are made up of the complex conjugate of the corresponding lower elements. The matrix can be formed as a square matrix with dimension p+1 by using $r_x(0), r_x(1), r_x(2), \ldots r_x(p)$ as the first column for the $R_x$ matrix and $r_x(0), r_x(1)^*, r_x(2)^*, \ldots r_x(p)^*$ (where * signifies complex conjugate) as the first row of the matrix and then filling in all remaining elements such that all diagonals are comprised of the same element. The correlation parameters, $r_x(k)$ can be found by summing over n from 0 to N the product of $x(n)x^*(n+k)$, where $x(n)$ are the input signal samples 403. N is the number of input signal samples to sum over and is often selected as a power of 2, such as 16 or 32, for calculation efficiency in a binary processor or process. Other known considerations for selecting N are the relative rate of change of the input signal, e.g. channel, and thus the statistics or stability of the statistics of the samples $x(n)$.

Given the $C_i$ and $R_x$ matrices, equation (2) can be evaluated for each value of 1 from 0 to p, however to do so requires a process or apparatus that can provide a matrix inverse in a computationally efficient and accurate manner in order to provide the best filter coefficients. Prior art solutions used adaptive least mean squares (LMS) or recursive least mean squares (RLS) techniques to estimate these coefficients. While these techniques can be computationally manageable they are unfortunately subject to problems, such as error levels that are not guaranteed, failure to converge to an answer, unknown rates of convergence, or rates of convergence that depend on error prone estimates for parameters that determine such convergence.

Figure 5:
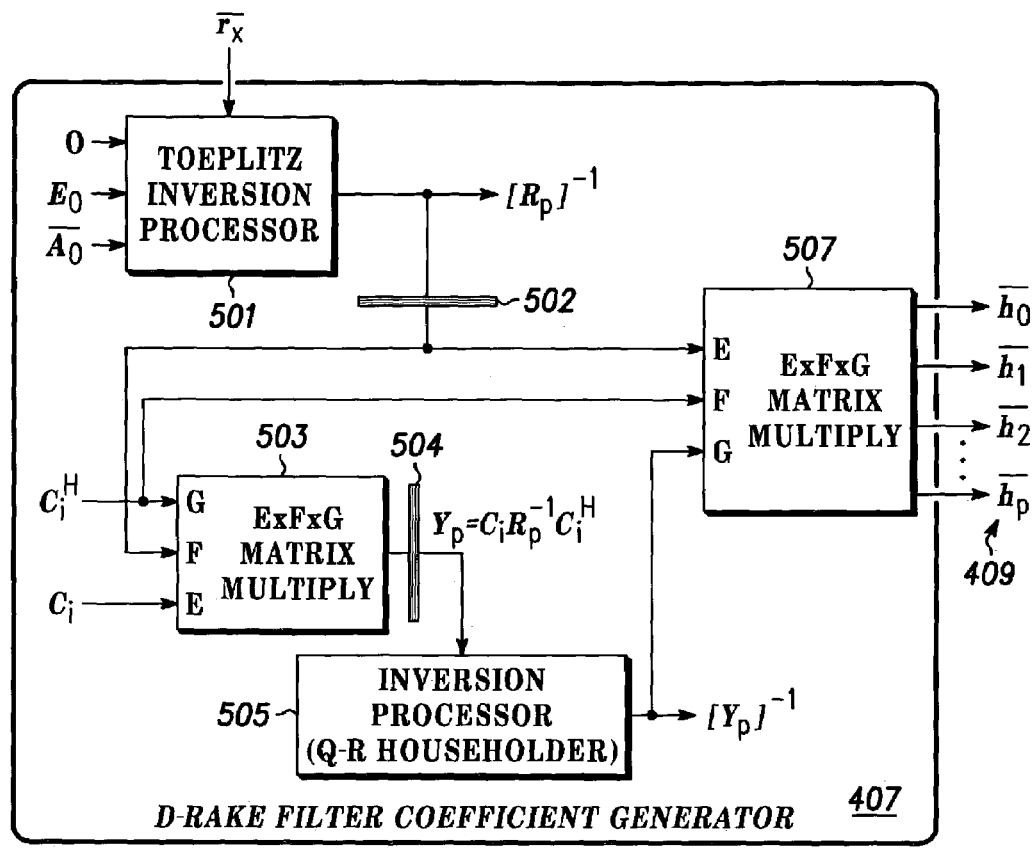
FIG. 5 depicts a functional diagram of a coefficient generator for the decorrelating rake receiver of FIG. 4.

Referring to FIG. 5, a functional diagram of the coefficient generator 407 for the decorrelating rake receiver 401 of FIG. 4 will be discussed and described. This architecture implements or solves equation (2) for the p+1 vectors of filter coefficients, each of which will include L+p+1 elements representing linear predictive coefficients for configuring a FIR filter. This architecture computes or determines an instantaneously accurate optimum solution via direct inversion of the proper inverse matrices within O(N) time which is as good as the adaptive LMS estimating approach. The coefficient generator includes an inversion processor 501, preferably a Hermitian Toeplitz inversion processor, to provide a matrix inverse, $[R_p]^{-1}$ corresponding to the autocorrelation parameters, $\overline{r_x}$, where the p subscript refers to the dimension, specifically p+1 of the matrix inverse. The inversion processor is coupled to or initialized by the parameters 0, $E_0$, and the vector $A_0$ that will be further discussed below with reference to FIG. 9. The coefficient generator basically combines according to equation (2) the matrix inverse and the receiver or desired signal identification information, represented by the $C_i$ and $C_i$ Hermitian matrices to provide the filter coefficients 409.

The matrix inverse, $[R_p]^{-1}$ is stored in a register 502 and applied to the matrix multiplier 503 together with the $C_i$ and $C_i$ Hermitian matrices to generate the matrix $Y_p$. $Y_p$ is stored in a register 504 and applied to a further inversion processor 505 that preferably uses a known Q-R Householder approach to provide $[Y_p]^{-1}$ or the inverse of $Y_p$. The matrix inverse, $[R_p]^{-1}$, $C_i$ Hermitian, and the inverse of $Y_p$ are applied to the matrix multiplier 507, where the respective p+1 rows of the resultant matrix represent the respective h vectors or filter coefficients 409.

Figure 6:
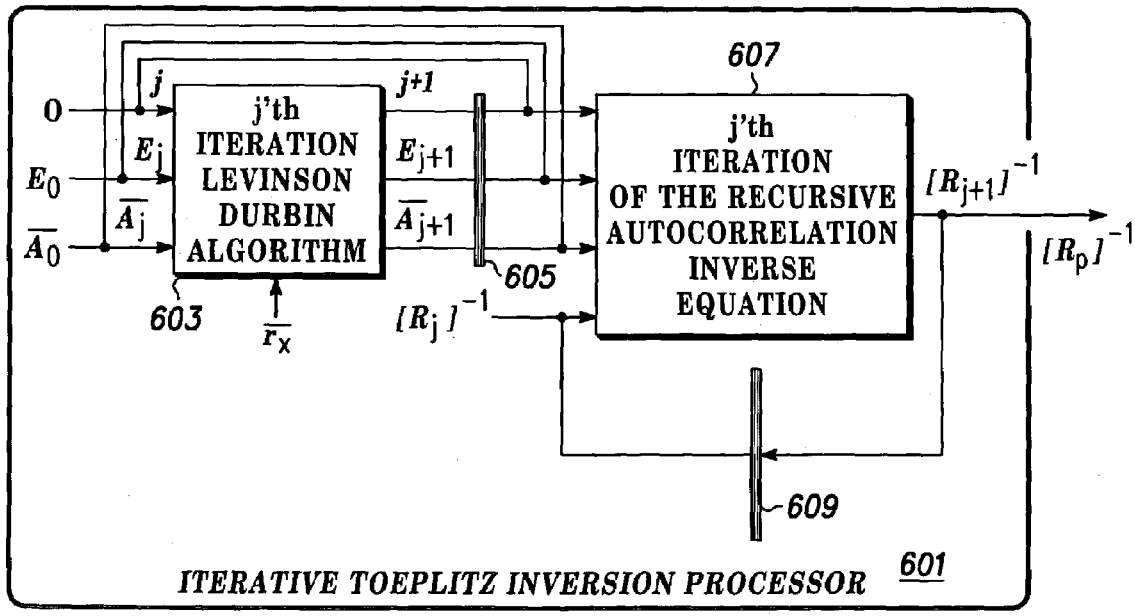
FIG. 6 depicts a functional diagram of a recursive embodiment for an inversion processor for the coefficient generator of FIG. 5.

Referring to FIG. 6, a functional diagram of a recursive embodiment or architecture 601 for the inversion processor used in the coefficient generator of FIG. 5 will be discussed and described. The recursive architecture comprises a prediction calculator 603 coupled to the autocorrelation parameters, $\overline{r_x}$ and further coupled, via a register 605 for storing intermediate results, to a matrix formulator 607, where the prediction calculator and matrix formulator are operable to provide the matrix inverse, $[R_p]^{-1}$. Intermediate results from the matrix formulator are stored in a register 609 for use in a subsequent iteration by the matrix formulator. This embodiment is relatively simple from a hardware perspective and provides a result in $O(N^2)$ time.

To provide the matrix inverse, the recursive architecture performs p iterations (j ranges from 0 to p−1) where the prediction calculator is initialized with the parameters 0, $E_0$, and the vector $A_0$ noted above. Preferably the prediction calculator 603 uses a Levinson Durbin algorithm to provide predictive information including a energy term $E_{j+1}$ and prediction coefficients A in the form of a vector $A_{j+1}$ to the matrix formulator 607 and the matrix formulator provides the matrix inverse after a predetermined number of iterations, e.g. p iterations. In summary the recursive architecture is operable to provide the matrix inverse by using a recursive process to provide the matrix inverse, the recursive process comprising iteratively employing a Levinson Durbin algorithm and the autocorrelation parameters to provide predictive information and iteratively formulating a sub matrix using the predictive information to provide the matrix inverse after a predetermined number of iterations. The particulars of the process used by the prediction calculator and matrix formulator will be further described below with reference to FIG. 8 and FIG. 9.

Figure 7:
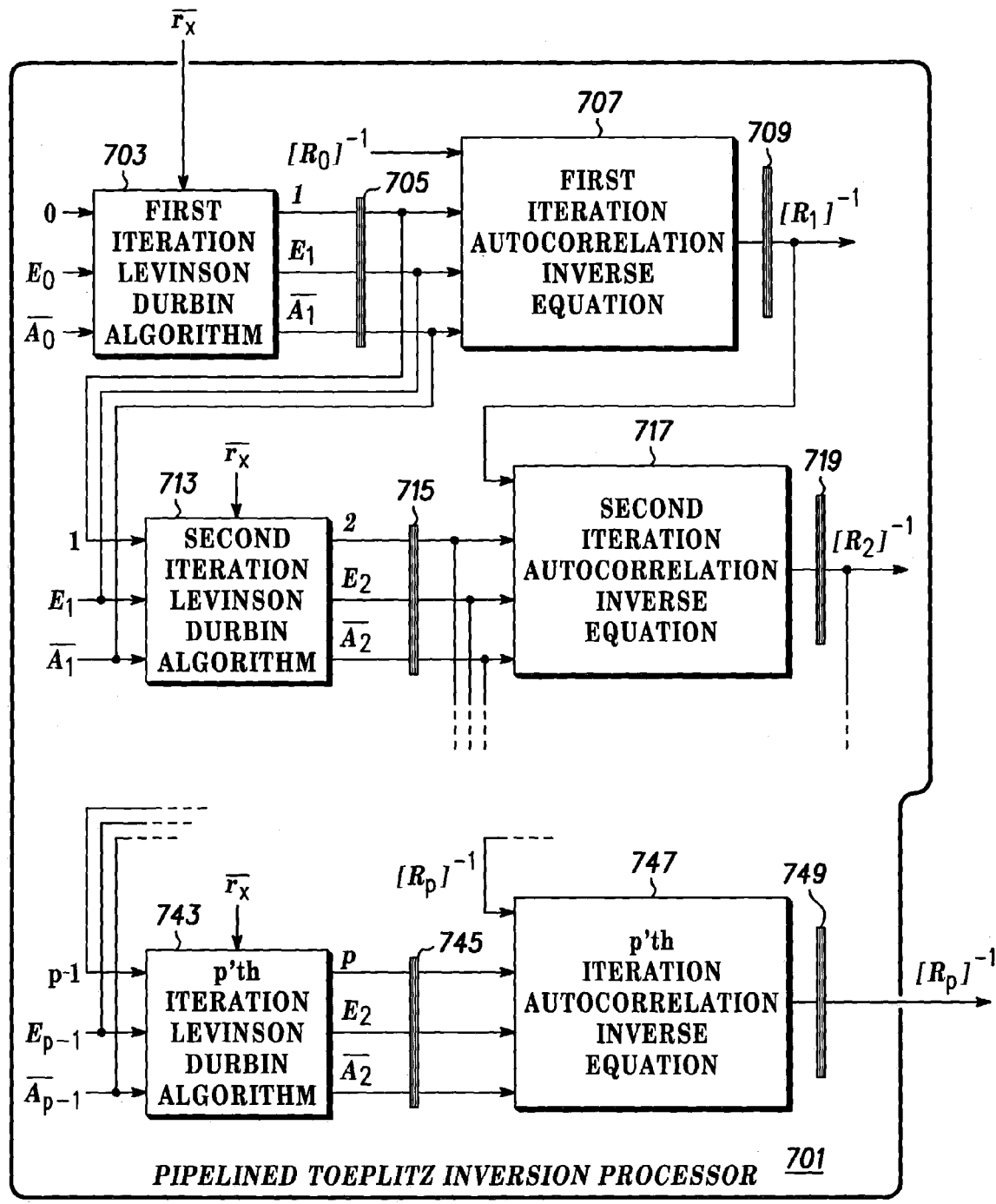
FIG. 7 depicts a functional diagram of a pipelined embodiment for an inversion processor for the coefficient generator of FIG. 5

Referring to FIG. 7, a functional diagram of a pipelined embodiment or architecture 701 for an inversion processor used in the coefficient generator of FIG. 5 will be discussed and described. The pipelined architecture 701 further comprises a plurality of prediction calculators 703, 713, 743 and a plurality of matrix formulators 707, 717, 747 inter coupled as depicted and operable to provide the matrix inverse, $[R_p]^{-1}$. Intermediate results or predictive information are stored in pipeline registers 705, 715, and 745 for outputs from the respective prediction calculators and in pipelined registers 709, 719, 749 for outputs from the respective matrix formulators.

Each of the prediction calculators uses a Levinson Durbin algorithm to provide predictive information to a corresponding one of the matrix formulators with a last one of the matrix formulators 747 providing the matrix inverse. Essentially the architecture from FIG. 6 is duplicated p times in the pipelined architecture and intermediate results are provided to a subsequent portion or stage of the hardware as soon as available. This allows a matrix inverse to be made available in O(N) time but is more hardware intensive than the recursive architecture. In summary the pipelined architecture is operable to determine or provide the matrix inverse using a pipelined process to provide the matrix inverse, the pipelined process comprising using a Levinson Durbin algorithm and the autocorrelation parameters to sequentially provide predictive information and sequentially formulating a sub matrix using the predictive information to provide the matrix inverse after a predetermined number, e.g. p, of formulations of the sub matrix.

Figure 8:
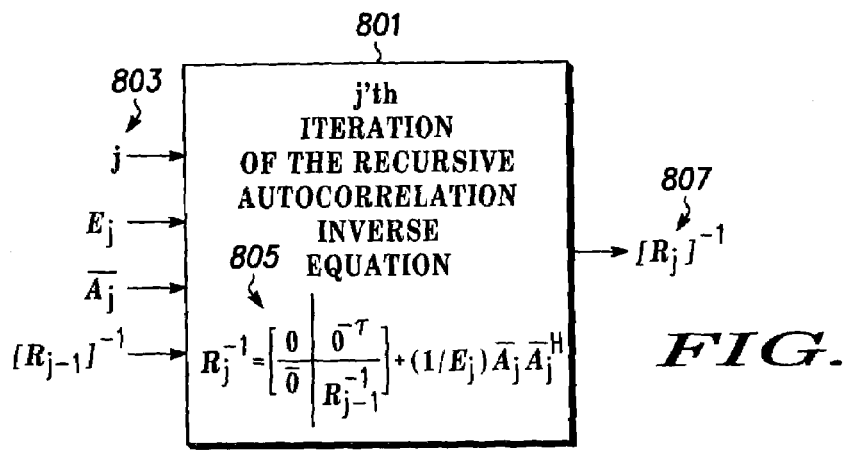
FIG. 8 depicts a functional diagram of a matrix formulator for use in the inversion processor of FIG. 6 and FIG. 7.

Referring to FIG. 8, a functional diagram of a matrix formulator 801 for use in the inversion processor of FIG. 6 and FIG. 7 will be discussed and described. Note that in this diagram j ranges from 1 up to p. The matrix formulator 801 using the inputs j, $E_j$, vector $A_j$, and sub matrix inverse $[R_j]^{-1}$ formulates, according to equation 805, the sub matrix inverse, $[R_j]^{-1}$ 807. When j=p the desired matrix inverse, $[R^p]^{-1}$ has been formulated. By observation, the equation 805 requires that two matrices be developed or calculated with the first comprising the sub matrix $[R_{j-1}]^{-1}$ with 0s added for each element in the first column and first row to increase the matrix dimension by one for each iteration. Multiplying the vector Aj by Aj Hermitian and then scaling each element by $1/E_j$ formulates or provides the second matrix, where $A_j$ and $E_j$ are provided by the prediction calculator. These two matrices are then added together to provide $[R_j]^{-1}$ 807.

Figure 9:
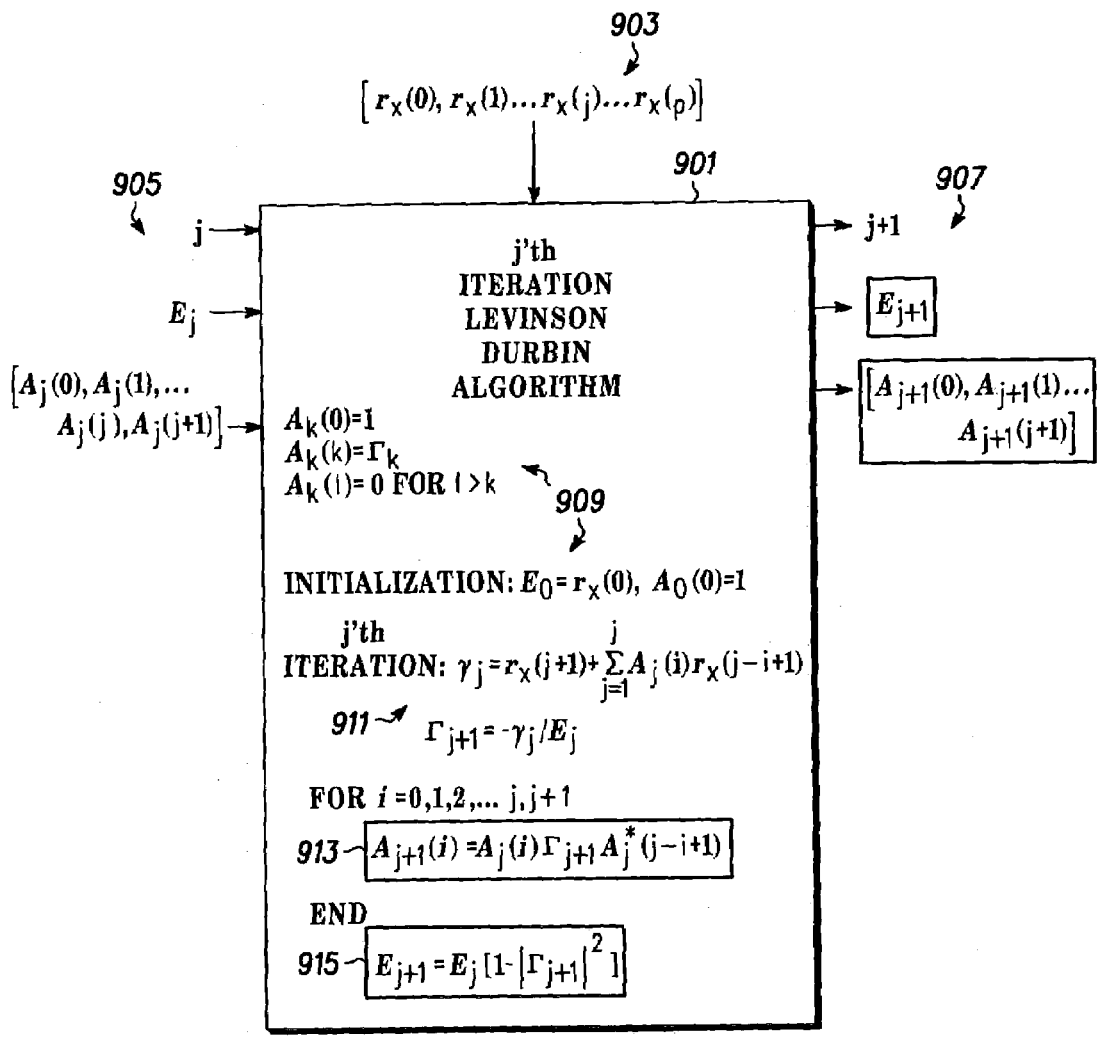
FIG. 9 depicts a functional diagram of a prediction calculator for use in the inversion processor of FIG. 6 and FIG. 7.

Referring to FIG. 9, a functional diagram of a prediction calculator 901 for use in the inversion processor of FIG. 6 and FIG. 7 will be discussed and described. Note that in this diagram j ranges from 0 up to p−1. The prediction calculator uses the autocorrelation parameters 903, shown as a vector, and the inputs 905, specifically j, an energy term $E_j$, and the vector $A_j$ to provide the outputs 907 including the next iteration of the energy term $E_{j+1}$ and vector $A_{j+1}$ according to the initial conditions 909 and equations 911, 913, and 915. These equations are a mathematical description of the known Levinson Durbin algorithm. The prediction calculator is a potentially reconfigurable processor kernel that can implement any specific iteration of the Levinson-Durbin algorithm. The output of the prediction calculator generates or provides the prediction coefficients, vector $A_j$, and minimum energy value, $E_j$ necessary for the update of the iterative Matrix Inverse calculation as indicated in FIG. 8. Note that this calculation computes the matrix inverses as discussed with reference to FIG. 5 through FIG. 8. By observation the dimension of the vector A grows with j and the number of the autocorrelation parameters that are considered likewise grows with j. As will be appreciated a structure or apparatus performing a process or method of directly, explicitly, and definitely determining or calculating the optimum filter coefficients for a decorrelating rake receiver has been described.

Figure 10:
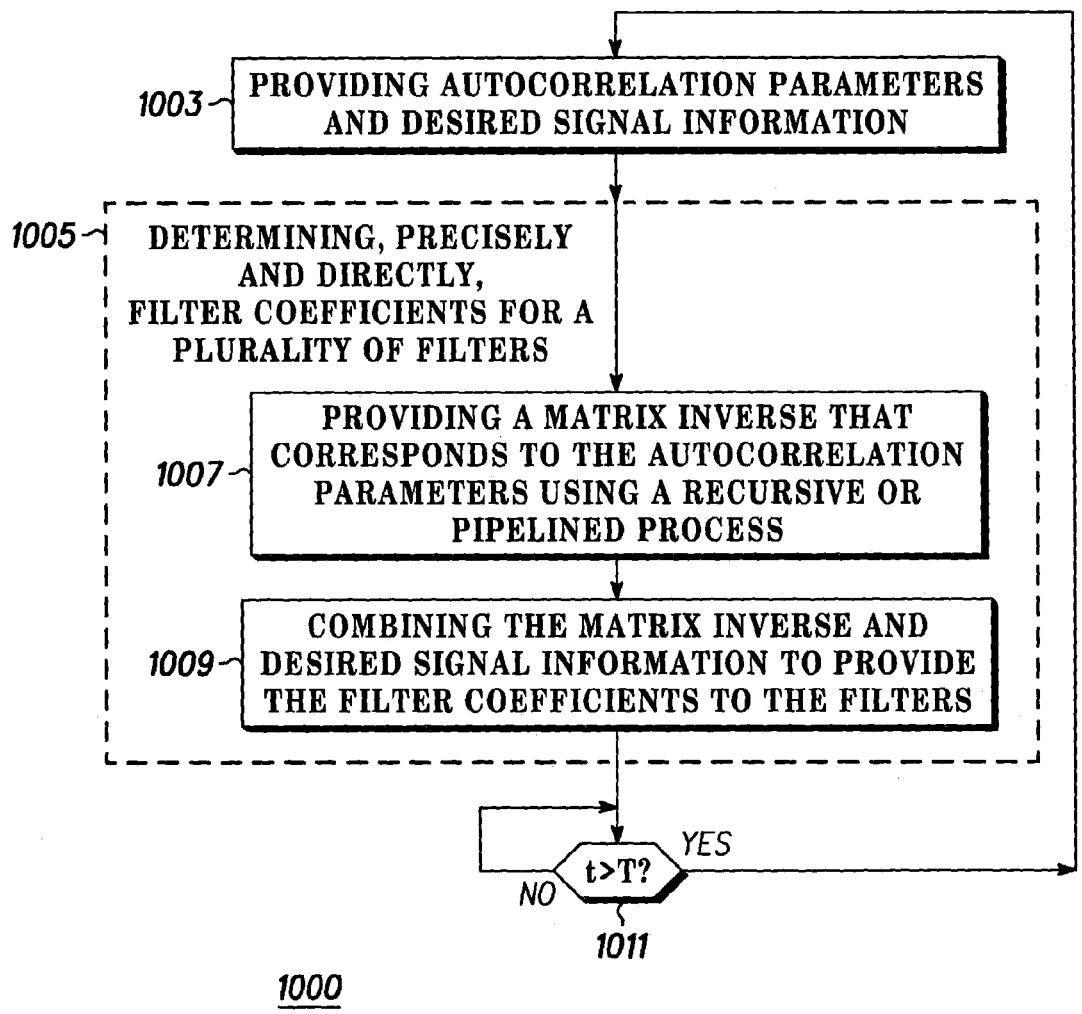
FIG. 10 shows a flow chart of a method of determining coefficients for a decorrelating rake receiver.

Referring to FIG. 10, a flow chart of a method 1000 of determining coefficients for a decorrelating rake receiver will be discussed and described. Some of this discussion will be in the nature of a review and summary of portions of the discussions above. The method is particularly suitable for use in a wireless communication device or a wireless communication base transceiver that are using protocols and modulation techniques where the process is applicable, for example spread spectrum protocols, such as CDMA, WCDMA, IEEE 802.11, and the like. The apparatus of FIG. 4 through FIG. 9 can advantageously perform the method 1000 although various other structures or apparatus would also be suitable for performing this method. The method 1000 is a method of determining filter coefficients for a decorrelating rake receiver, where these coefficients are directly determined, which in at least some embodiments can also be described as being deterministically, definitely, accurately and precisely determined, according to the optimization equations (1) and (2) without resorting to iterative and recursive estimation procedures for such coefficients.

The method 1000 begins at 1003 by providing desired signal information, such as the spreading code for a particular signal or receiver as well as autocorrelation parameters that correspond to an input signal that includes or may include desired and undesired or interfering signals. Then at 1005 the method determines or calculates, precisely and directly, the filter coefficients for a plurality of filters, such that the plurality of filters will operate to perform a decorrelating rake process. The filter coefficients are a function of the autocorrelation parameters and the desired signal information. The procedure at 1005 is preferably comprised of additional operations with 1007 providing a matrix inverse, using a recursive or pipelined process, corresponding to the autocorrelation parameters and with 1009 combining the matrix inverse and the desired signal information to provide the filter coefficients. Then 1011 determines whether the filter coefficients should be updated by testing t against T. The 1011 process depicted is merely exemplary and a number of factors may influence whether the filter coefficients should be updated, such factors including whether the channel has changed or rate of change of the channel between the source and receiver, as well as available processing resources for calculating new coefficients.

Both the recursive and pipelined process rely on the known Levinson Durbin algorithm as discussed above with reference to FIG. 9 and iteratively and sequentially formulating a sub matrix as reviewed above with reference to FIG. 8. The recursive process uses a Levinson Durbin algorithm and the autocorrelation parameters to provide predictive information and then iteratively formulates a sub matrix using the predictive information to provide the matrix inverse after a predetermined number of iterations. The pipelined process uses a Levinson Durbin algorithm and the autocorrelation parameters to sequentially provide predictive information and then sequentially or iteratively formulates a sub matrix using the predictive information to provide the matrix inverse after a predetermined number of formulations of the sub matrix.

Thus a novel and advantageous approach and structure has been described and discussed that directly determines or calculates, rather than estimates, filter coefficients for optimally implementing a decorrelating rake receiver. Note that the filter coefficients that have been determined are coefficients that define a FIR filter. The number of coefficients that are determined for each filter correspond to the length, L chips, of the spreading code in a spread spectrum system plus the channel delay spread or memory, expressed in number of chips, p+1. Techniques, such as Henkel approximations can be used to convert these FIR coefficients to coefficients for other forms of filters, such as infinite impulse response (IIR) filters, if the implementation of a FIR filter with this number of coefficients becomes overly burdensome on processing resources.

The principles and concepts discussed and described has the potential to dramatically increase the capacity for wireless systems utilizing spread spectrum technology by greatly increasing the sensitivity of a CDMA receiver. We can also apply these principles to 3G systems which utilize short spreading codes such as those proposed in 3G, 3.5G and 4G systems and to Multi-user detection algorithms that require the computation of a matrix inverse with a Toeplitz structure. Multi-user detection has been proposed, for example, in Time Division-CDMA systems such as those found in China. Any system requiring fast and accurate computation of a Matrix inverse can benefit from these approaches. Many advanced digital communications systems require such a computation for optimum performance. It is also possible to apply the principles and concepts to channel estimation in arbitrary digital communication systems. In such systems, the estimation of the channel coefficients can have a significant impact on the system performance.

The apparatus, processes, and systems discussed above and the inventive principles thereof can alleviate problems caused by present approaches for estimating filter coefficients for decorrelating rake receivers as well as offer a novel and advantageous methodology for providing such filter coefficients for use, for example in a wireless communications receiver or device. Using the above discussed principles of providing autocorrelation parameters for a signal, calculating or determining the filter coefficients using these autocorrelation parameters and desired signal information in a direct, deterministic, and definite manner to yield explicit, precise and optimum coefficients, and using these coefficients to configure a plurality of filters for a decorrelating rake receiver will facilitate a cost effective, efficient, and practical process for reducing MAI and thus increasing system capacity and contributing to user satisfaction.

It is expected that one of ordinary skill given the above described principles, concepts and embodiments will be able to implement other alternative procedures and structures that may be communications device or protocol dependent and that will also offer additional quick and efficient procedures for facilitating filters for a decorrelating rake receiver. It is anticipated that the claims below cover many such other procedures and structures.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A decorrelating rake receiver comprising:
    a plurality of filters arranged to be coupled to an input signal and to accept filter coefficients, the plurality of filters operable to provide a plurality of output signals;
    a coefficient generator, arranged to be coupled to the input signal and the plurality of filters, to explicitly and definitely determine the filter coefficients for the plurality of filters such that the plurality of filters perform a decorrelating rake process;
    a combiner, coupled to the plurality of filters, to combine the plurality of output signals and provide a received signal; and
    an autocorrelation processor coupled to the input signal to provide autocorrelation parameters to the coefficient generator, the autocorrelation parameters corresponding to the input signal;
    wherein the coefficient generator is further coupled to receiver identification information,
    wherein the coefficient generator further comprises an inversion processor to provide a matrix inverse corresponding to the autocorrelation parameters, and
    wherein the inversion processor uses a recursive architecture to provide the matrix inverse.

2. The decorrelating rake receiver of claim 1 wherein the coefficient generator combines the matrix inverse and the receiver identification information to provide the filter coefficients.

3. The decorrelating rake receiver of claim 1 wherein the recursive architecture further comprises a prediction calculator coupled to the autocorrelation parameters and further coupled to a matrix formulator, the prediction calculator and matrix formulator operable to provide the matrix inverse.

4. The decorrelating rake receiver of claim 3 wherein the prediction calculator uses a Levinson Durbin algorithm to provide predictive information to the matrix formulator and the matrix formulator provides the matrix inverse after a predetermined number of iterations.

5. The decorrelating rake receiver of claim 1 wherein the inversion processor uses a pipelined architecture to provide the matrix inverse.

6. The decorrelating rake receiver of claim 5 wherein the pipelined architecture further comprises a plurality of prediction calculators and a plurality of matrix formulators inter coupled and operable to provide the matrix inverse.

7. The decorrelating rake receiver of claim 6 wherein each of the prediction calculators uses a Levinson Durbin algorithm to provide predictive information to a corresponding one of the matrix formulators with a last one of the matrix formulators providing the matrix inverse.

8. The decorrelating rake receiver of claim 1 used in one of a wireless communication device and a wireless communication base transceiver.

9. A method of determining filter coefficients for a decorrelating rake receiver, the method comprising:
providing autocorrelation parameters corresponding to an input signal and desired signal information; and
determining, precisely and directly, the filter coefficients for a plurality of filters such that the plurality of filters will operate to perform a decorrelating rake process, the filter coefficients being a function of the autocorrelation parameters and the desired signal information,
wherein the determining the filter coefficients further comprises providing a matrix inverse corresponding to the autocorrelation parameters, and
wherein the providing the matrix inverse further comprises using a recursive process to provide the matrix inverse.

10. The method of claim 9 wherein the determining the filter coefficients further comprises combining the matrix inverse and the desired signal information to provide the filter coefficients.

11. The method of claim 9 wherein the using the recursive process further comprises using a Levinson Durbin algorithm and the autocorrelation parameters to provide predictive information and iteratively formulating a sub matrix to provide the matrix inverse after a predetermined number of iterations.

12. The method of claim 9 wherein the providing the matrix inverse further comprises using a pipelined process to provide the matrix inverse.

13. The method of claim 12 wherein the using the pipelined process further comprises using a Levinson Durbin algorithm and the autocorrelation parameters to sequentially provide predictive information and sequentially formulating a sub matrix to provide the matrix inverse after a predetermined number of formulations of the sub matrix.

14. The method of claim 9 used in one of a wireless communication device and a wireless communication base transceiver.

15. A signal processor arranged and constructed to determine filter coefficients for a decorrelating rake receiver, the signal processor when executing software instructions being operable to:
provide autocorrelation parameters corresponding to an input signal; and
compute, explicitly with a predetermined number of computations, the filter coefficients for a plurality of filters such that the plurality of filters will operate to perform a decorrelating rake process, the filter coefficients being a function of the autocorrelation parameters and desired signal information;
wherein the signal processor is further operable to compute the filter coefficients by providing a matrix inverse corresponding to the autocorrelation parameters and combine the matrix inverse and the desired signal information to provide the filter coefficients, and
wherein the signal processor is further operable to provide the matrix inverse by using a recursive process to provide the matrix inverse, the recursive process comprising iteratively employing a Levinson Durbin algorithm and the autocorrelation parameters to provide predictive information and iteratively formulating a sub matrix using the predictive information to provide the matrix inverse after a predetermined number of iterations.

16. The signal processor of claim 15 further operable to provide the matrix inverse using a pipelined process to provide the matrix inverse, the pipelined process comprising using a Levinson Durbin algorithm and the autocorrelation parameters to sequentially provide predictive information and sequentially formulating a sub matrix using the predictive information to provide the matrix inverse after a predetermined number of formulations of the sub matrix.

17. The signal processor of claim 15 used in one of a wireless communication device and a wireless communication base transceiver.

18. A wireless communication device for receiving a spread spectrum signal, the wireless communication device comprising:
a receiver front end to receive a composite spread spectrum signal and provide a sampled spread spectrum signal corresponding to the composite spread spectrum signal;
a plurality of filters arranged to be coupled to the sampled spread spectrum signal, the plurality of filters having respective characteristics defined by filter coefficients and being operable to provide a plurality of output signals;
a coefficient generator, arranged to be coupled to autocorrelation parameters corresponding to the sampled spread spectrum signal and a spreading code information corresponding to the spread spectrum signal, to explicitly and definitely determine the filter coefficients such that the plurality of filters perform a decorrelating rake process;
a coherent combiner to combine the plurality of output signals and provide a composite sampled output signal having a reduced level of multiple access interference; and
a despreader to despread the composite sampled output signal to provide the spread spectrum signal,
wherein the coefficient generator further comprises an inversion processor to provide a matrix inverse corresponding to the autocorrelation parameters and to combine the matrix inverse and the spreading code information to provide the filter coefficients, and
wherein the inversion processor uses one of a recursive architecture and a pipelined architecture to provide the matrix inverse.

19. The wireless communication device of claim 18 wherein the inversion processor further comprises a prediction calculator coupled to the autocorrelation parameters and further coupled to a matrix formulator, the prediction calculator and matrix formulator operable to provide the matrix inverse.

20. The wireless communication device of claim 19 wherein the prediction calculator uses a Levinson Durbin algorithm to provide predictive information to the matrix formulator and the matrix formulator provides the matrix inverse after a predetermined number of calculations.

21. The wireless communication device of claim 18 wherein the spread spectrum signal is a code division multiple access signal.

22. The wireless communication device of claim 18 wherein the coefficient generator to explicitly and definitely determine the filter coefficients follows a process that yields a definite and precise result for the filter coefficients after a predetermined number of operations that corresponds to the number of autocorrelation parameters.

* * * * *